Dec. 18, 1956  W. W. KRAUSE ET AL  2,774,524
COMBINATION OF COOKING UNTENSIL AND SPOUT
Filed Nov. 1, 1954.  2 Sheets-Sheet 1

INVENTORS:
Walter W. Krause
and Fred C. Schwaneke
BY
Watson D. Harbaugh
Atty.

Dec. 18, 1956 W. W. KRAUSE ET AL 2,774,524
COMBINATION OF COOKING UNTENSIL AND SPOUT
Filed Nov. 1, 1954 2 Sheets-Sheet 2
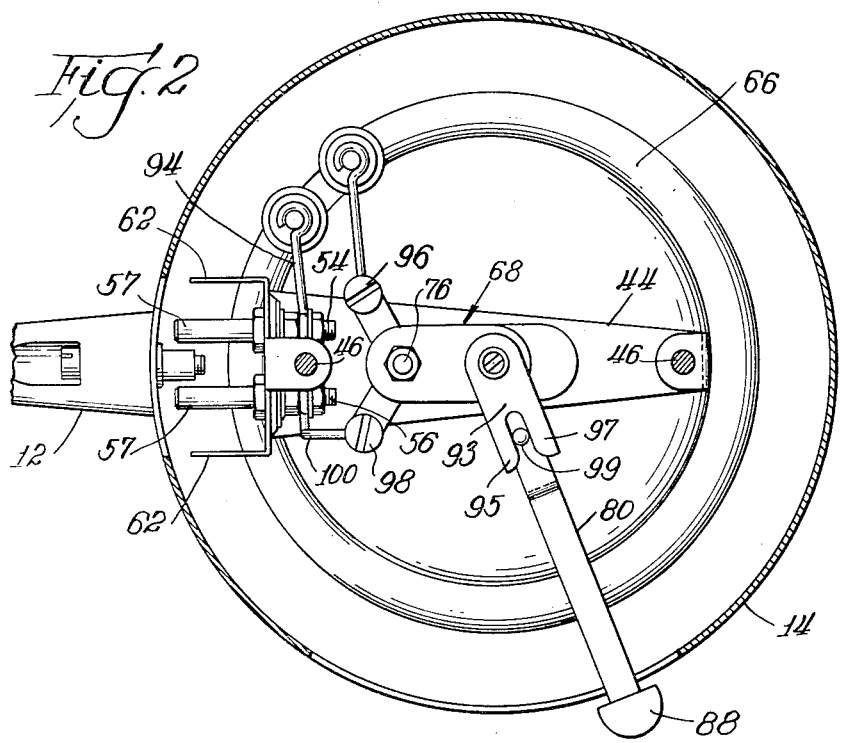
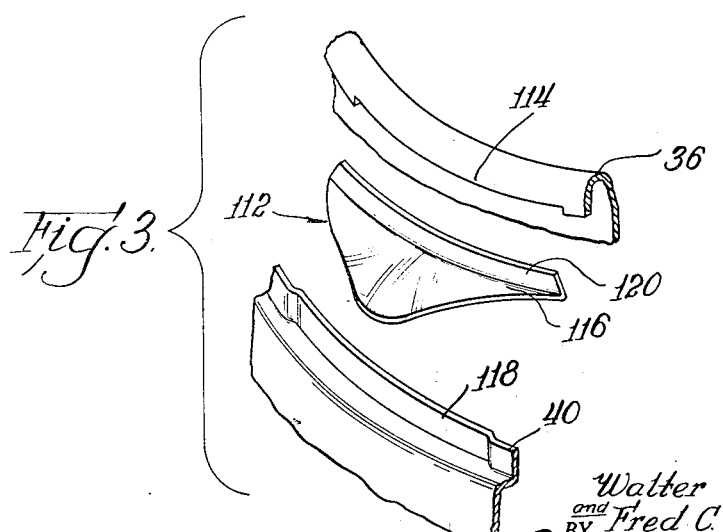
INVENTORS:
Walter W. Krause
and Fred C. Schwaneke
BY
Atty.

United States Patent Office 2,774,524
Patented Dec. 18, 1956

2,774,524

COMBINATION OF COOKING UTENSIL AND SPOUT

Walter W. Krause and Fred C. Schwaneke, Chicago, Ill., assignors to Dormeyer Corporation, Chicago, Ill., a corporation of Illinois Application November 1, 1954, Serial No. 465,949

7 Claims. (Cl. 222—567)

This invention relates to cooking utensils, and more particularly to a cooking utensil for use in cooking eggs which is provided with a removable spout adapted to align the inner and outer portions of the utensil.

Cooking utensils having an inner food containing well and an outer housing member have been subject to the difficulty that in manufacture the inner portion is liable to spin, so that aligning the inner and the outer portion for fastening is difficult. Similarly, pouring from the type of container conventionally used for poaching eggs and the like has been messy because such containers are not usually provided with a spout; and utensils having a spout are subject to the difficulty that the spout is not readily accessible for cleansing.

Accordingly, applicant has provided a cooking utensil having a removable spout keyed to the inner and outer members of the vessel to maintain them in a relatively fixed position to each other.

Among the objects of the present invention are the provision of a spout which may be readily removed for cleansing; the provision of a cooking vessel having a construction for the inner and outer portions thereof adapted to securely engage with the spout to hold it in operative position; the provision of a spout and vessel adapted to engage therewith to hold fastening means on the inner and outer portions of the vessel in registration; and provision of a spout which is adapted for use as a handle to lift the inner portion of the vessel from the outer portion thereof. Referring now to the drawings, Figure 1 is a vertical sectional view partly broken away of a cooking utensil according to the present invention;

Figure 2 is a horizontal sectional view taken along line 2—2 of Figure 1 disclosing in particular the disposition of the heating elements in the utensil;

Figure 3 is an exploded fragmentary perspective view of the spout construction adapted to key with the inner and outer portions of the vessel whereby to hold them in firmly aligned relationship; and Figure 4 is a top plan view of a support plate and handle for egg-poaching cups and the like.

Figure 1:
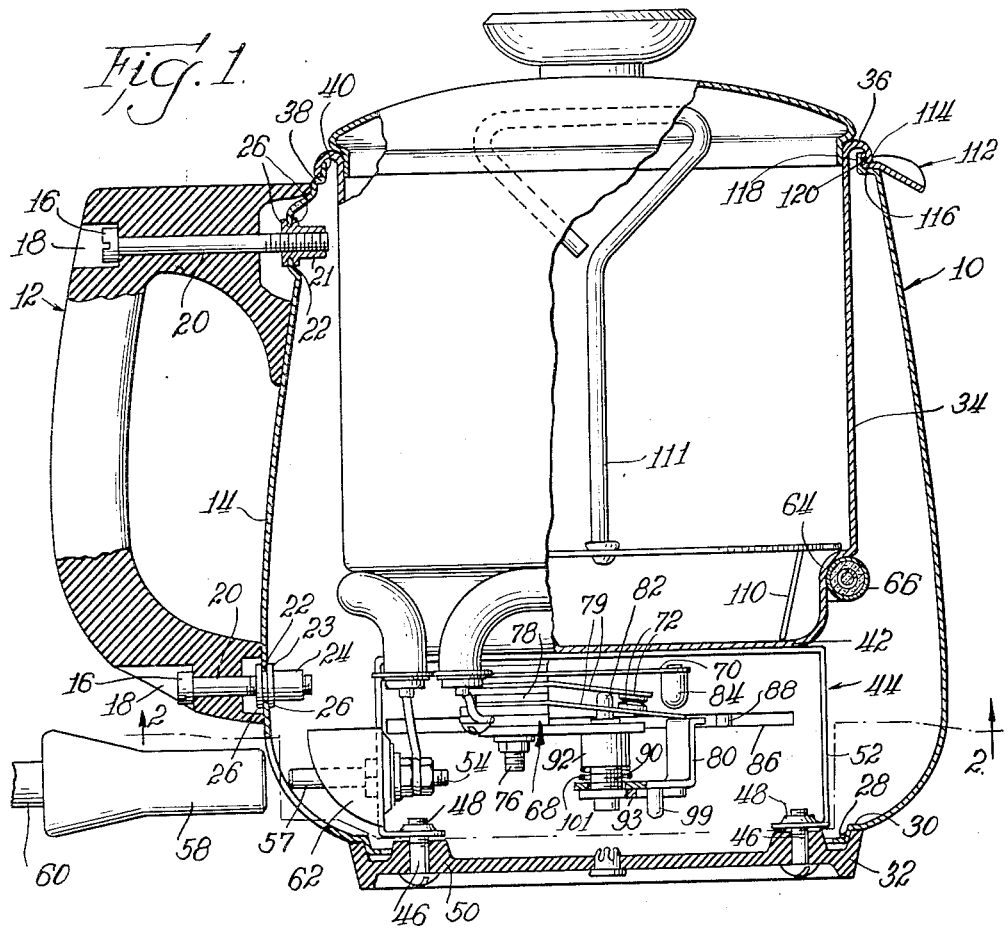

Referring now to Figure 1, the cooking utensil 10 has a conventional handle 12 formed thereon of suitable insulative material and secured to an outer housing member 14 by means of bolts 16. The handle 12 is provided with apertures 18 and bores 20 to receive bolts 16, and the housing 14 is likewise provided with apertures 22 of preferably substantially greater width than the diameter of the bolts 16. The bolts 16 are secured by nuts 24 to the housing, the nuts having a diameter substantially that of the apertures 22 and being provided with double flanges 23 adapted to secure therebetween the wall 14. The housing 14 is preferably of circular cross section, as seen in Figure 2, and is offset inwardly at its top portions as will be hereinafter described. The bottom portion of the housing 14 is likewise offset inwardly to provide two seating surfaces 28 and 30 for a bottom plate 32 preferably formed of substantially heat-resistant refractory material such as porcelain or the like.

A unitary metal cooking well 34 is provided internally of the casing 14 to hold the food to be cooked and has upper edges 36 flanged outwardly and downwardly to seat upon the shoulder 38 formed by the aforementioned inset portion of the casing 14, and engaging snugly the flange 40 forming the upper marginal edge of the housing 14. The bottom 42 of the cooking well 34 has secured thereto by welding or other suitable means a metal bracket 44 bolted to the bottom plate 32 by bolts 46 received in internally threaded bosses 48 of bracket 44 and bosses 50 of the plate, the bosses 48 being integrally formed on depending flanges 52 of bracket 44.

The flange 52 adjacent the handle member 12 is adapted to support electrical posts 54 and 56 bolted thereto, the posts being provided with prongs 57 adapted to be received in electrically connected relationship in the plug 58 secured to the electrical cord 60. Bracket 44 is also provided with wing guides 62 to securely seat the plug 58. The cooking well 34, which is preferably formed of copper or other highly heat conductive material, is inset at 64 to receive therearound a metal encased unitary heating element 66 often referred to as a Calrod or Monorod. Element 66 comprises a metal alloy tubing surrounding a heating element encased in a heat conducting, electrically insulated refractory material.

The bracket 44 carries a thermostat 68 having a bimetal strip 70 and two electrical make-and-break contacts 72, carried by leaf springs 74 clamped together at their base on a sleeve bolt 76 having electrical insulating washers 78 disposed between them. The leaf springs normally urge the contacts 72 to make contact, but one of them is adjustably movable away from the other by means of a handset control shaft 80 having a dielectric thrust pin 82 engaging the upper one of the springs. The lower spring is subjected to deflection by an intermediate dielectric pin 84 carried by the bimetallic member 70. Shaft 80 is preferably loosely journalled upon a stud 90 pivotally secured in the internally threaded sleeve 92.

A bracket 93 is fixedly secured to the lower end of the stud 90 and is provided with prongs 95 and 97 extending around lug 99, which is mounted dependently on the shaft 80 and has disposed therearound a helical spring 101 interposed between shaft 80 and bracket 93.

Thus, when knob 88 on shaft 80 is moved transversely by slot 86 through which shaft 80 protrudes, the lug 99 actuates bracket 93 to turn stud 90 and move the pin 82 vertically for proper adjustment. The shaft may be preset at a figure of 180° marked on the external casing 14 whereby to insure accurate temperature for poaching eggs, this being one of the main functions of the vessel.

In one position of the knob 88, the inner spring and contact are depressed inwardly far enough to separate the two contacts 72 under all possible conditions, and this position is utilized as the "off" position. When the knob is moved to any other predetermined position, the two contacts 72 are permitted to come together at an initial or resting position to close the circuit, which includes the heater 66, one end of the heater being connected across the house line by the extension cord 60 through the lead 94, and the other end of the heater being connected with the thermostat at 96 and with the house outlet through 98 and lead 100. As the temperature in the vessel 34 rises and is transmitted by conduction through bolt 76 to the thermostat, the temperature will approach the temperature set for the vessel by the said member 88, the heat radiation from the wall of the vessel adding to the effect on the thermostat. When the given temperature is attained, the current is cut off by opening of the contact 72. Cooling of the bimetallic element 70 will cause the heater to be turned on again before the temperature of the vessel falls appreciably.

Figure 4:
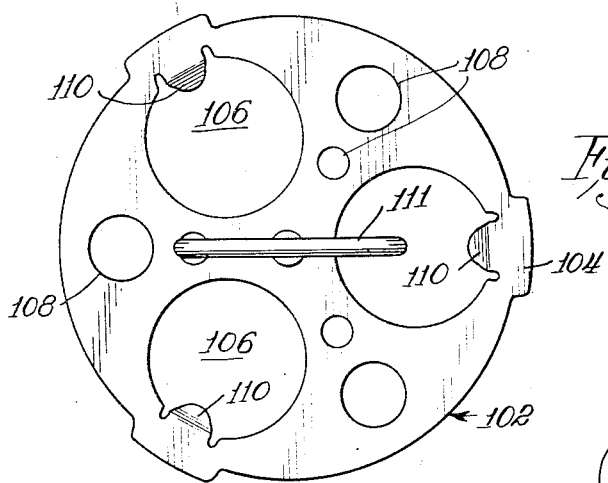

The cooking well 34 is preferably provided internally with a perforated shelf 102, such as is disclosed in Figure 4, adapted to rest on the inset portion 64 at flanges 104. The plate 102 is provided with large apertures 106 for receiving egg poaching cups and smaller apertures 108 which are useful in permitting steam to rise therethrough so that the shelf 102 will maintain its stable position. The shelf is also preferably provided with legs 110 downwardly therefrom and is provided with a handle 111 secured thereto by welding or other suitable means.

Referring now to Figure 3, a spout element 112 is disclosed which is adapted to be removably keyed between flanged portion 36 of the vessel 34 and shoulder portion 40 of the casing to hold these members in alignment as will be hereinafter described. Thus, the flanged portion 36 of the vessel 34 is offset along the outer marginal edge thereof at 114 a distance substantially equal to the thickness of the base 116 of the spout element 112, and the flange 40 is provided with an inset portion 118 which is spaced with respect to the flange 40 a width substantially equal to the width of the rear vertical keying flange 120 of the spout 112.

In manufacturing the vessel, the internal cooking well 34 with the heating elements secured thereto is set down into the housing 14; and before the marginal flange 36 engages the flange 40, the spout 112 is seated upon the shoulder 38 of the casing 14 so that the key member 120 is disposed in abutting relationship to inset portion 118. Thereupon, the flange 36 is set downwardly over the keying flange 120 in abutting relation thereto, to maintain the flange 120 in snug engagement with the inset portion 118 of flange 40. The base 116 of the spout will be engaged at the same time by the offset portion 114 of flange 36, so that the spout 112 is locked against transverse movement with respect to both the inner and the outer portions of the vessel. Accordingly, the tendency of the cooking well 34 to spin or rotate with respect to housing member 14 during insertion and immediately thereafter, and to move the bracket 44 out of alignment with the plate member 32 disposed therebelow, will be overcome and the receiving bosses 48 and 50 for the bolts 46 will be maintained in vertical registration. At the same time, torsional stress between the bottom of the member 34 and the fastening member 44 will be eliminated so that the whole construction is much more secure than has been possible heretofore.

The spout itself is maintained in fixed and securely locked position by the same keying action. The spout may also be used as a handle to remove the cooking well 34 from the housing member 14 to provide access to the operative portions of the vessel, the flange 120 bearing against the flange 36 to lift the well upward upon loosening the bolts 46. The spout may be very readily cleaned when thus disengaged and thereupon reinserted as above described.

While we have described and explained the present invention with reference to certain features of adaptability, it is to be understood that the construction whereby the inner and outer vessels are maintained against mutual relative rotation by means of a spout member keyed therebetween is subject to considerable modification. Accordingly, it is not to be limited by the illustrated embodiment of the accompanying drawings nor by the foregoing language except as indicated in the hereunto appended claims.

The invention claimed is:

1. In a cooking utensil, a housing member having an inset upper marginal edge, a cooking well having an outwardly and downwardly turned flange adapted to engage said marginal edge, and a spout member having an upwardly turned flange adapted to removably engage between said marginal edge and said downwardly turned flange to maintain said housing member and cooking well in mutually stable alignment.

2. In a cooking utensil, a housing member having an inset upper marginal edge, a cooking well having an outwardly and downwardly turned flange adapted to overlie said marginal edge in snug engagement therewith, a configured portion on said marginal edge and a spout having a keying flange at the rear marginal edge thereof adated to key with said configured portion of said marginal edge.

3. In a cooking well according to claim 2, a configured portion on the edge of said flange on said cooking well adapted to key with said spout whereby to secure said housing member and cooking well against relative angular rotation.

4. A cooking utensil comprising a housing member having an inset upper marginal edge, a cooking well having an outwardly and downwardly turned flange adapted to overlie said marginal edge in snug engagement therewith, an inset portion on said marginal edge and a spout having a keying flange at the rear marginal edge thereof adated to key with said inset portion of said marginal edge.

5. In a cooking utensil according to claim 4, a base portion on said spout adapted to seat on the inset upper marginal edge of said housing member and an offset portion in the edge of said flange on said cooking well adapted to key with the base portion of said spout.

6. In a cooking vessel, a cooking well having an outwardly and downwardly turned marginal flange formed peripherally on the upper edge thereof, a housing member enclosing the walls of said cooking well and having an inset flange formed on the upper marginal edge thereof and adapted to engage said flange on said cooking well when said cooking well is nested within said housing member, an inset flange formed on the bottom edge of said housing member, a base plate adapted to engage said inset flange, bolt receiving bosses on said base plate and said cooking well respectively for securing together said housing member, cooking well and base plate, a cutout portion on the edge of said marginal flange on said cooking well, a recessed portion on said flange on the upper marginal edge of said housing member and a spout member adapted to be removably engaged by said cutout portion of said flange and in said recessed portion of said flange on the upper marginal edge of said housing whereby to maintain said bolt receiving bosses against relative angular rotation when said housing member is seated on said base plate and said spout is keyed between said flanges on said cooking well and said housing.

7. In a cooking utensil, a housing member having an inset upper marginal edge, a cooking well having an outwardly and downwardly turned flange adapted to overlie said marginal edge in snug engagement therewith, and complementary keying contours on said upper marginal edge of said housing member and said outwardly and downwardly turned flange on said cooking well respectively adapted to lock said housing member and cooking well against relative angular rotation when said cooking well and housing member are in nested relationship.

No references cited.